No. 716,999. Patented Dec. 30, 1902.
J. R. GEORGE.
CONVEYER FOR METAL RODS OR BARS.
(Application filed May 24, 1902.)
(No Model.)
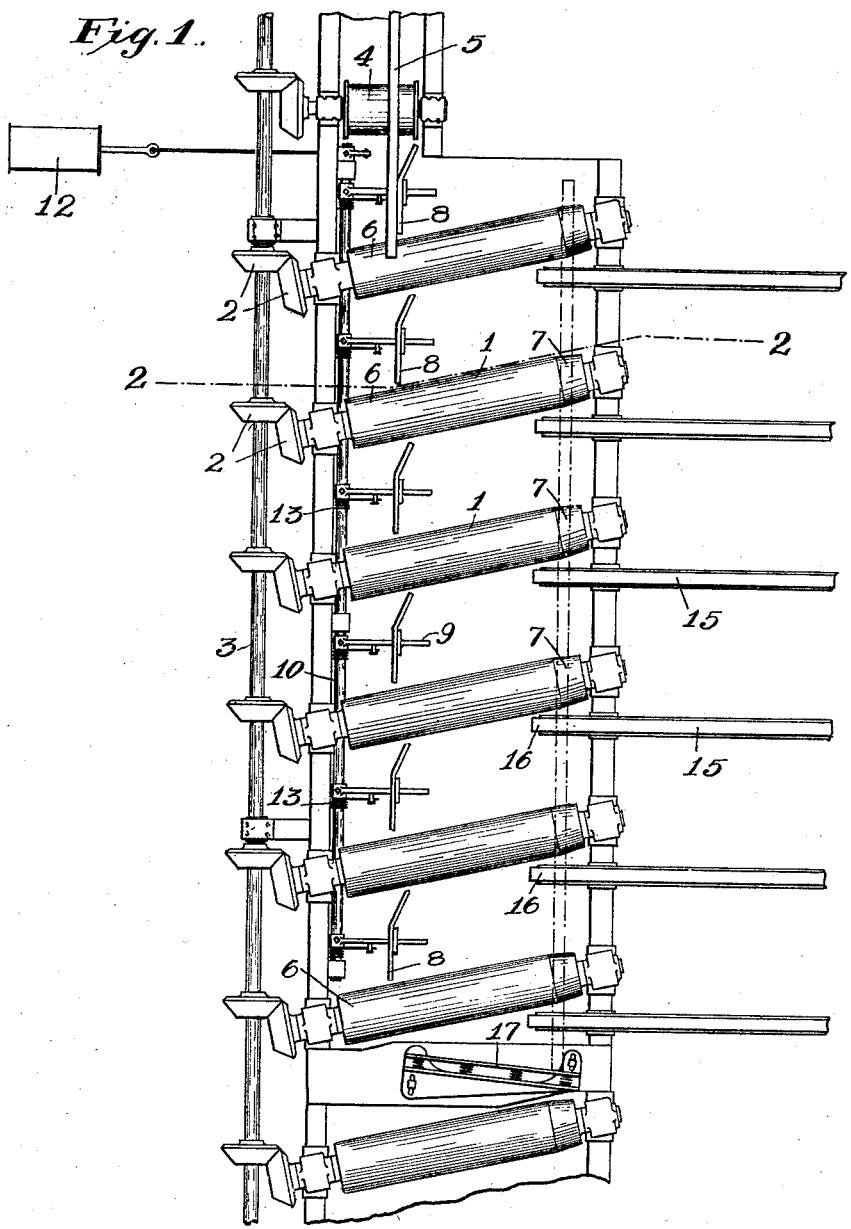
Fig. 1.
Fig. 2.
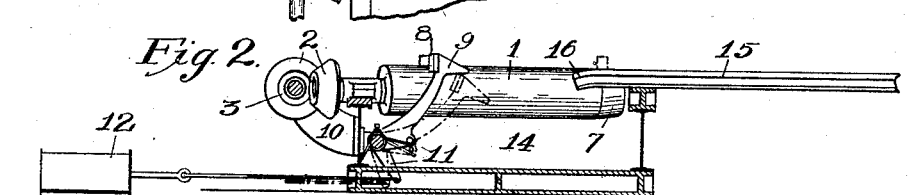
Witnesses
Inventor
Jerome R. George
By Rufus B. Fowler
Attorney

UNITED STATES PATENT OFFICE.

JEROME R. GEORGE, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

CONVEYER FOR METAL RODS OR BARS.

SPECIFICATION forming part of Letters Patent No. 716,999, dated December 30, 1902.

Application filed May 24, 1902. Serial No. 108,785. (No model.)

*To all whom it may concern:*

Be it known that I, JEROME R. GEORGE, a citizen of the United States, residing at Worcester, in the county of Worcester and Commonwealth of Massachusetts, have invented a new and useful Improvement in Conveyers for Metal Rods or Bars, of which the following is a specification, accompanied by drawings forming a part of the same, in which—

Figure 1 represents a plan view of my improved conveyer, and Fig. 2 is a transverse sectional view of the same.

Similar reference-figures refer to similar parts in both views.

My present invention relates to a conveyer for metal rods or bars whereby a longitudinal movement may be imparted to a rod or bar over said conveyer, or, if desired, a combined longitudinal and sidewise movement may be imparted to the rod or bar, whereby the rod or bar may be delivered at will either by a longitudinal movement from the end of the conveyer or by a sidewise movement from the side of the conveyer; and my invention consists in the construction and arrangement of parts, as hereinafter described, and pointed out in the annexed claims.

Referring to the accompanying drawings, 1 1 denote a series of rotating conveyer-rolls journaled in suitable bearings and driven, through beveled gears 2 2, from a common driving-shaft 3, whereby a rotary motion is conveyed to the several conveyer-rolls in the same direction. The conveyer-rolls are journaled in the same horizontal plane, with their upper surfaces adapted to support thereon a rod or bar delivered to the conveyer at one end, whereby the rod or bar will be moved lengthwise by the rotation of the rolls toward the opposite end of the conveyer. The rolls 1 1 are journaled with their axes forming an oblique angle to the line of longitudinal movement of the rod or bar delivered upon the conveyer, whereby the rotation of the conveyer-rolls will tend to move the rod or bar by a sidewise movement toward one side of the conveyer. At one end of my conveyer I place a series of short conveyer-rolls, one of which is shown at 4, Fig. 1, over which a rod or bar 5 is delivered upon the oblique conveyer-rolls, near the ends 6 of the conveyer-rolls, and I prevent the sidewise movement of the rod 5 toward the opposite ends 7 of the conveyer-rolls by means of a side guide or stop, which in the present instance consists of a series of plates 8, attached to radial arms 9, which are carried by a rock-shaft 10, provided at one end with a radial arm 11, which is connected with a reciprocating piston in a hydraulic or steam cylinder 12 or other suitable motive power by which the shaft 10 can be rocked in one direction. The shaft 10 is also provided with a series of coiled springs 13, by which the movement of the shaft is reversed when released. The side guides or stops 8 are normally held in the plane of the moving rod or bar over the conveyer-rolls 1, so that when the rod has been brought against the side guides or stops its further sidewise movement will be prevented, and the rod or bar will then be moved lengthwise across the conveyer and delivered therefrom at the opposite end of the conveyer. Whenever it is desired, however, to deliver the rod or bar by a sidewise movement from the conveyer, the shaft 10 is rocked to depress the side guides or stops 8, bringing them below the plane of the traveling rod or bar, as shown by the broken lines 14, Fig. 2, thereby allowing the rod or bar to be moved sidewise by the action of the rotating conveyer-rolls toward the ends 7 of the rolls, from which it is delivered upon stationary skids 15, the ends 16 of the skids overlapping the ends 7 of the conveyer-rolls. The ends 16 of the skids are preferably bent or turned downward to facilitate the transfer of the rod or bar thereon, and the ends 7 of the rolls are also slightly tapered for the same purpose. In order to insure the delivery of the rods or bars upon the skids 15 and prevent their being carried too far by their longitudinal movement, I place a yielding stop-plate 17 in position to receive the contact of the ends of the bar and hold them from longitudinal movement. The yielding stop-plate 17 is placed at a slight inclination to the longitudinal movement of the bar, the inclination of the plate being opposite that of the axes of the conveyer-rolls 1 for the purpose of decreasing the friction between the end of the rod or bar and the yielding stop-plate. The yielding stop-plate extends only across the space between the side guides 8 and the ends 7 of the rolls, thereby permitting the free longitudinal movement of the rods or bars between the side guides 8 and the ends 6 of the conveyer-rolls, so that the rods or bars may be diverted at will, either by a longitudinal movement off the end of the conveyer itself or by a sidewise movement off the ends of the conveyer-rolls and delivered at the side of the conveyer.

What I claim as my invention, and desire to secure by Letters Patent, is—

1. In a conveyer for metal rods or bars, the combination with a series of rotating conveyer-rolls with their upper surfaces arranged to support a rod or bar thereon, said rolls having their axes placed at an oblique angle to the line of longitudinal motion of the rod or bar, whereby a sidewise movement is imparted to the rod or bar, of a side guide by which the sidewise movement of the rod or bar is prevented and means for moving said side guide out of the plane of the rod or bar, substantially as described.

2. The combination with a series of conveyer-rolls having their axes at an oblique angle to the line of motion, of a rod or bar supported thereon, a side guide by which the sidewise movement of the rod or bar is limited and means for moving said side guide out of the plane of the rod or bar, substantially as described.

3. The combination with a series of conveyer-rolls having their axes placed at an oblique angle to the longitudinal movement of the rod or bar supported thereon, of a side guide for limiting the movement of the rod or bar, means for moving said side guide out of the plane of the rod or bar and an end guide for limiting the longitudinal movement of the rod or bar, substantially as described.

4. The combination with a series of conveyer-rolls having their axes placed at an oblique angle to the longitudinal movement of the rod or bar supported thereon, of a side guide near one side of said conveyer for limiting the sidewise movement of the rod or bar and permitting its longitudinal movement over the ends of the conveyer-rolls, means for moving said side guide out of the plane of the rod or bar and thereby allowing the rod or bar to be moved sidewise toward the opposite end of the conveyer-rolls and an end guide or stop-plate by which the endwise movement of the rod or bar is limited after it passes said side guide, substantially as described.

5. The combination of conveyer-rolls 1, 1, of a series of side guides 8, 8 between said rolls and normally held in the plane of a rod or bar supported on said rolls, a rocking shaft carrying said side guides, means for rocking said shaft to depress said side guides or stops for limiting the endwise movement of the rod or bar after it has passed said side guides, substantially as described.

6. The combination of a series of conveyer-rolls 1, 1, side guides 8, rocking shaft 10, means for rocking said shaft to depress said side guides and springs for reversing the motion of said shaft and normally holding said side guides in the plane of a rod or bar supported on said conveyer-rolls, substantially as described.

Dated this 19th day of May, 1902.

JEROME R. GEORGE.

Witnesses:
M. M. SCHUERMANN,
RUFUS B. FOWLER.